United States Patent [19]

Hsu et al.

[11] Patent Number: 5,418,947
[45] Date of Patent: May 23, 1995

[54] LOCATING INFORMATION IN AN UNSORTED DATABASE UTILIZING A B-TREE

[75] Inventors: Gordon K. Hsu, Naperville; Liheng M. Su, deceased, late of Naperville, both of Ill., by Yung-Kuei Tan Su, executrix

[73] Assignee: AT&T Corp., Murray Hill, N.J.

[21] Appl. No.: 995,858

[22] Filed: Dec. 23, 1992

[51] Int. Cl.6 .............................................. G06F 15/40
[52] U.S. Cl. ............................ 395/600; 364/DIG. 1; 364/222.81; 364/222.9
[58] Field of Search ........................................ 395/600

[56] References Cited
U.S. PATENT DOCUMENTS

| | | | |
|---|---|---|---|
| 4,215,402 | 7/1980 | Mitchell et al. | 395/425 |
| 4,527,239 | 7/1985 | Brandin | 395/600 |
| 4,611,272 | 9/1986 | Lomet | 395/600 |
| 4,677,550 | 6/1987 | Ferguson | 395/600 |
| 4,922,417 | 5/1990 | Churm et al. | 364/DIG. 1 |
| 5,204,958 | 4/1993 | Cheng et al. | 395/600 |
| 5,319,779 | 6/1994 | Chang et al. | 395/600 |

Primary Examiner—Thomas G. Black
Assistant Examiner—John C. Loomis
Attorney, Agent, or Firm—Charles L. Warren

[57] ABSTRACT

A binary search tree is created having a plurality of linked tree nodes, each of which store a key generated using a predetermined hashing function for each record in a database based upon a predetermined set of fields of each record. Tree nodes consist of such keys and the address of the corresponding record. The keys are arranged on the tree relative to the numerical value of keys previously entered in the tree. To locate a particular record, the key is generated for the record and the tree is traversed to locate a tree node having an identical key value. The address stored with the matching node in the tree is utilized to access the record.

11 Claims, 2 Drawing Sheets

BINARY SEARCH TREE

LOCATING INFORMATION IN AN UNSORTED DATABASE UTILIZING A B-TREE

BACKGROUND OF THE INVENTION

This invention is directed to locating a particular record in a database containing a plurality of records.

A typical database can accommodate a plurality of records each having a number of different fields. Locating a record or a group of records using a predetermined search criteria such as a particular name in a last name field can be accomplished by sequentially searching each record and making a comparison of the data contained in the last name field with the desired last name. In order to insure that all records have been located matching the search criteria, all records must be searched. The time required for such a search depends upon the number of records in the database and the complexity of the search criteria.

In some database applications the identity of a particular record will be known since identifying data in one or more fields is available. In this situation the objective is to quickly locate the particular record in an unsorted database so that the full record can be accessed or in order to modify the data in the record. A direct approach for locating a desired record(s) is to sequentially search the records to locate the record(s) having data in one or more fields that is equal to the search criteria data. However, this method is relatively inefficient. This is especially apparent where the record identification criteria may locate more than one record in the database, thereby requiring a search of all records in order to insure that the appropriate records have all been located.

It is known to utilize a table in which a unique identifier for each record is stored as one entry with the corresponding address of the record stored as a second entry for each record. Thus, to locate a record, only the table need be searched as opposed to a search of the records themselves. Although this technique is more efficient than directly searching the records, on a statistical basis a search of 50 percent of the number of entries in the unsorted table will be required to locate the identifier in the table.

A number of applications exist in which identification criteria for a particular record is known. Thus, the challenge exists in efficiently locating the particular record in the database. A database in a telecommunications switch contains parameters which reflect features selected by customers to be utilized for their telephone service. In order to maintain the database, it is desirable to be able to search the database to locate specific records and verify correct relationships between records.

A database utilized to identify library materials represents another example in which it is desirable to be able to locate a predetermined record based upon a known search criteria such as by a unique identifying number. The records may be required to be located in order to update the record to reflect that material is checked out to a given individual. To check out a book from a library, a librarian enters a unique number for a book into a database so that the corresponding record can be updated to reflect that the book has been checked out to a specific person on a particular date. In order to minimize the time required to locate a particular record, there exists a need for an improved record location technique which allows a record to be more quickly located than a sequential search of the database.

SUMMARY OF THE INVENTION

It is an object of the present invention to provide an improved method for efficiently locating a record in a database when data in at least one predetermined field is known and utilized to identify a particular record.

In accordance with an exemplary embodiment of the present invention, a key is generated for each record based upon the individual data contained within predetermined fields of the record such as by utilizing a hashing technique. A binary search tree is created and contains a plurality of linked tree nodes wherein each node comprises one of the keys and the address of the corresponding record associated with the key. The keys are arranged on the tree relative to the numerical value of keys previously entered in the tree. In order to locate a particular record based upon data stored in the identification fields, the same hashing technique is utilized to generate a key corresponding to the identification field data of a particular record. This particular key is then utilized to search the tree until a match is located with a key stored on the tree. The address stored with the matching key located on the tree is utilized to access a corresponding record. Preferably, this record is checked to verify that it corresponds to the record being sought. In databases having a substantial number of records, the technique in accordance with the present invention reduces the time required to locate a particular record as compared with conventional sequential search techniques.

DETAILED DESCRIPTION

Figure 1:
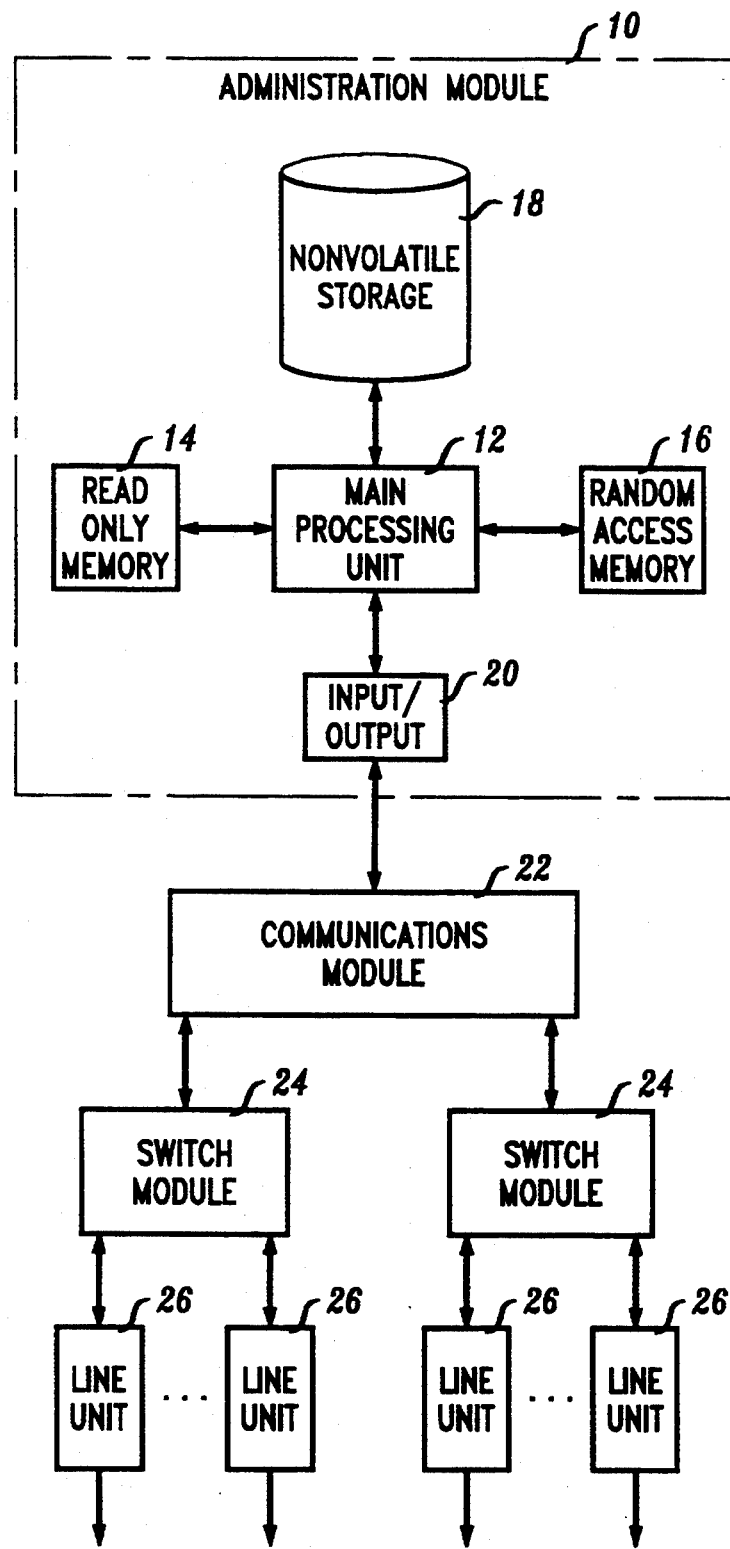
FIG. 1 is a block diagram of a telecommunications switching system incorporating an exemplary embodiment of the present invention.

FIG. 1 illustrates a telecommunications switching system which incorporates an embodiment of the method in accordance with the present invention. The illustrative system may comprise a 5ESS® switch available from AT&T. Administration module 10 includes a main processing unit (microprocessor) 12 which is supported by read only memory 14, random access memory 16 and a nonvolatile data storage device 18. An input/output interface device 20 provides an interface between the main processing unit 12 of the administration module 10 and a communications module 22. Switch modules 24 are coupled to communications module 22 and a plurality of line units 26 which support individual telephone subscribers. Signals from each subscriber line are multiplexed by the corresponding switch module by a time slot interchanger (not shown) in each switch module, thereby multiplexing a plurality of subscriber communications into a data stream which is transmitted to the communications module 22. Each channel carried by the multiplexed data stream is connected to respective destination channels by the communications module, thereby connecting a calling subscriber with a called subscriber to provide desired end-to-end communications.

The administration module 10 supports office administration and maintenance functions as well as controlling the processing of the calls by the communications and switch modules. Office dependent data (ODD) is stored as records in a database in random access memory 16 of administration module 10. The database contains a plurality of records which are utilized in the processing of a call. For example, the ODD records in the database are consulted when a customer configurable feature is requested to determine if access to the feature is permitted for a given subscriber. It is updated in order to change desired functions such as to add a call waiting or call forwarding feature, and to modify speed dialing entries. Table 1 which follows illustrates an exemplary set of records such as may be stored in a database.

TABLE 1

| Record ID | Storage Location | Type | Record | Key 1 | Key 2 | Data |
|---|---|---|---|---|---|---|
| ID 1 | ADR 1 | I | R1 | 13 | 251 | DATA 1 |
| ID 2 | ADR 2 | I | R2 | 7 | 47 | DATA 2 |
| ID 3 | ADR 3 | I | R3 | 172 | 140 | DATA 3 |
| ID 4 | ADR 4 | U | R2 | 7 | 47 | DATA 4 |
| ID 5 | ADR 5 | I | R4 | 86 | 238 | DATA 5 |
| ID 6 | ADR 6 | I | R5 | 20 | 113 | DATA 6 |
| ID 7 | ADR 7 | U | R3 | 172 | 140 | DATA 7 |
| . | . | . | . | . | . | . |
| . | . | . | . | . | . | . |
| . | . | . | . | . | . | . |

Referring to Table 1, each tuple or row in the database represents data stored in different fields relating to a single record identified by the columns in the table. Each record is identified by a unique record identification number as shown in the Record ID column. The Type column represents an indicator of the type of record such as "I" for an initial or original record and "U" for an update of a previously existing record. The Storage Location column contains the memory address (location) at which the record is stored in memory. The Record column provides a label for each record and allows related records to be identified as indicated. It will be noted that updated records contain the same record identification as the corresponding initial record. The Key 1 and Key 2 columns represent independent data fields associated with each record which are utilized to identify parameters associated with each record and are utilized in the exemplary embodiment of the present invention to uniquely identify each record. Thus, it will be noted that record ID 4 contains the same data in columns Key 1 and Key 2 as record ID 2 since the former represents an update of the latter record. The same relationship exists between updated record ID 7 and initial record ID 3. The Data column represents a field in which various data such as character strings or other parameter information is stored for each record.

In the exemplary embodiment, additional records are added to the database, as represented by Table 1 as changes are made by customers or system administrators to features defined by the records stored in the database. Changes are made to the ODD on a realtime basis in order to allow customers the flexibility of changing customer selectable features on demand. The database is periodically backed up or copied to the nonvolatile storage device 18 to permit the restart of the telecommunications switch in the event of a crash. Because the contents of the database reflects the office dependent data utilized by the switch, the ODD stored on the nonvolatile device can be utilized to perform system maintenance and error checking functions. Utilizing the ODD stored in nonvolatile memory has the additional advantage of not interrupting or providing additional loading of the switch, since the stored data can be accessed independent of the need of the switch for realtime access of the ODD stored in RAM.

TABLE 2

| Record | Record ID | Hashed Key |
|---|---|---|
| R1 | ID 1 | 5371 |
| R2 | ID 2 | 7289 |
| R3 | ID 3 | 2007 |
| R2 | ID 4 | 7289 |
| R4 | ID 5 | 1338 |
| R5 | ID 6 | 9490 |
| R3 | ID 7 | 2007 |
| . | . | . |
| . | . | . |
| . | . | . |

Table 2 illustrates that a hashed key is generated for each of the corresponding records in Table 1. A hashed key is a digital word created by the application of a hashing function on the values of data stored in predetermined fields of a record. In the illustrative example, the data in fields Key 1 and Key 2 are utilized as inputs for the hashing function; however, different numbers of fields can be used as inputs for the hashing function depending on the organization of the particular database. Since the data in the Key 1 and Key 2 fields are the same for records ID 2, ID 4 and records ID 3, ID 7, it will be noted that the corresponding hashed keys for these records are the same. In the preferred embodiment of the present invention, the hashed keys are generated of equal length, that is, each hashed key comprises a number capable of being represented by the same number of digits or bits.

Various hashing techniques are generally known. It is an object of a hashing function not to generate duplicate keys for records having different data in fields upon which the key is based. Such hashed keys represent undesired duplicates which must be treated specially as described below. An example of a hashing function is described in U.S. Pat. No. 4,922,417 entitled "Method and Apparatus for Data Hashing Using Selection from a Table of Random Numbers in Combination with Folding and Bit Manipulation of Selected Random Numbers"; this patent is incorporated herein by reference.

Figure 2:
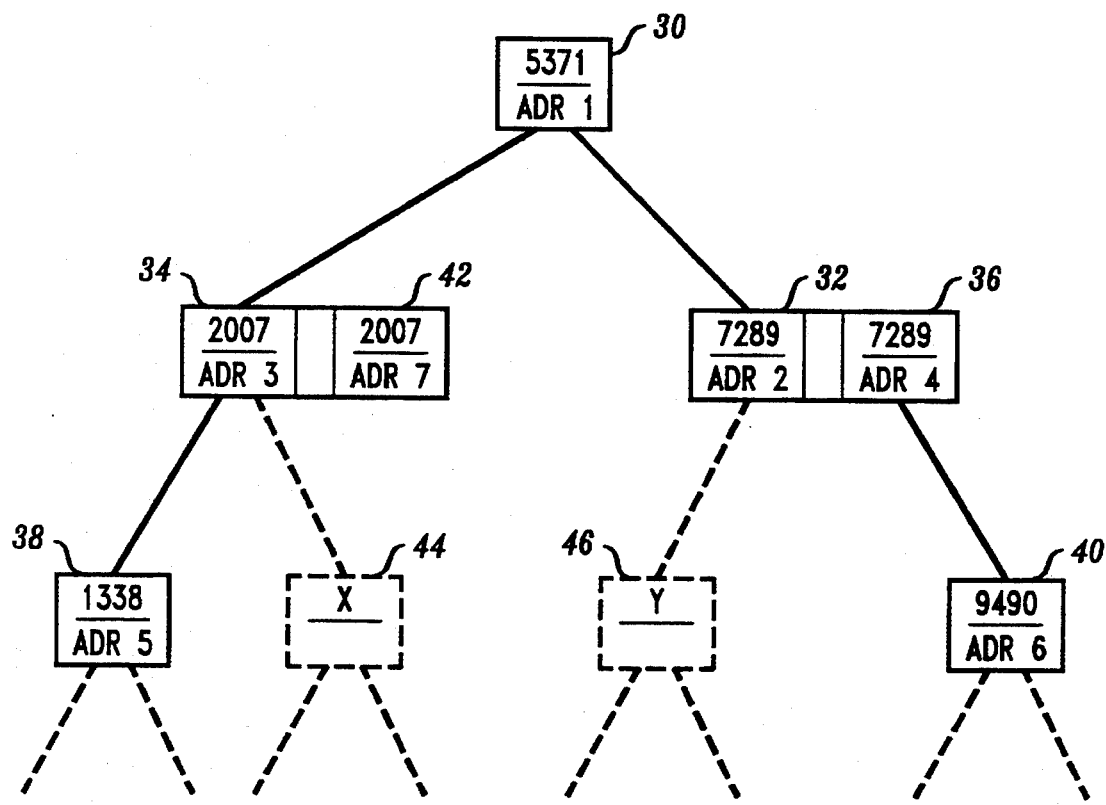
FIG. 2 is a pictorial diagram illustrating a binary search tree utilized in the exemplary method in accordance with the present invention.

FIG. 2 is a pictorial representation of a binary search tree utilized in accordance with the preferred embodiment of the present invention. The binary search tree consists of a plurality of linked tree nodes 30, 32, 34, 36, 38, 40, 44, and 46. Stored in each tree node is a hashed key for a record and that record's corresponding address location (ADR X). The tree is created based on hashed key information of Table 2 and the Storage Location column information of Table 1.

The creation of the tree will be described beginning with the vertex tree node 30. The hashed key for the first record (ID 1) in Table 2 which also corresponds to the first record in Table 1, comprises a hashed key having a value of 5371. For purposes of illustration, arbitrary four digit numbers were assigned for each key. This hashed key value is stored along with the address location, ADR 1, of the corresponding record as tree node 30. The next record, ID 2, has a hashed key value of 7289. In the illustrative binary tree, nodes are added by placing them at the end of a free tree branch. A left branch is followed when the key value is less than the key value of a reference node and a right branch is followed when the key value is greater than the key value of the reference node. In the illustrative embodiment, the key for the second record is greater than the key for the first record and hence, node 32 is established on a right branch below node 30 along with the address ADR 2 for the record ID 2.

The next record ID 3 has a key value of 2007 which is less than the key of node 30 and hence, it is placed on a left branch below node 30 as node 34 along with address ADR 3. Record ID 4 comprises an update of record ID 2 and hence, the ID 2 and ID 4 keys are the same value. Since the key associated with record ID 4 is greater than the key of node 30, a right branch is taken. Comparing the key of ID 4 with tree node 32, it is apparent that the keys are equal. In the preferred embodiment of the present invention, the updated record address ADR 4 is substituted for address ADR 2 when equal key values exist and a relationship exists between the records, i.e. Key 1 and Key 2 data for the records are the same. Equal key values which refer to related records are consolidated such that tree node 36 and 32 will become a consolidated single node having a key value of 7289 and an address of ADR 4. This process can also be described as overwriting the data in node 32 with the data of node 36 This technique is utilized in the illustrative embodiment since an updated record contains the most current information and there is no information in the prior related records which need be retained.

The record ID 5 contains a key value of 1338 which is less than the value of the key of node 30 and is less than the value of the key of node 34 previously entered on the tree. Thus, a new tree node 38 branching left from node 34 is created having a key value of 1338 and address ADR 5. The record ID 6 is greater than the key of node 30 and greater than the key of consolidated nodes 32, 36 and hence, is disposed as node 40 consisting of a right branch under consolidated nodes 32, 36. The record ID 7 consists of a key of 2007. Since this key is less than the key of node 30, it proceeds left to node 34. Comparison of the key of ID 7 with the key of ID 3 reveals that the keys are equal and since record ID 7 is related to record ID 3, a consolidated node 34, 42 is created having a key of 2007 and an address of ADR 7.

Exemplary tree nodes 44 and 46, and the dashed line branches represent that a plurality of additional tree nodes will be placed on the binary search tree to form a geometrically increasing structure until all records have been entered on the tree. To be disposed as node 44, a corresponding key value X would be 5371>X>2007; to be disposed as node 46, a corresponding key value Y would be 7289>Y>5371.

The object of the hash function is to generate keys which have different key values for different input parameters, such as based on the data fields of Key 1 and Key 2 in the illustrative embodiment. Since a realistically obtainable hash generator is not perfect, errors or duplicate keys based on different input criteria must be accommodated. Where a duplicate key is generated for a record which is not related to a previous record, a "conflict key" exists. Conflict keys are not consolidated such as nodes 34, 42 and 32, 36. As illustrated in Table 3, the conflict keys CK(N) and associated addresses ADR(CK(N)) are stored in a separate conflict key list during the creation of the binary search tree.

TABLE 3

| Conflict Keys | Address |
|---|---|
| CK 1 | ADR(CK 1) |
| CK 2 | ADR(CK 2) |
| . | . |
| . | . |
| . | . |

A search of the tree results in a conflict situation when the data in fields Key 1 and Key 2 of the record referenced by the tree node does not match the corresponding data used to generate the key used for the search. When such a key collision occurs, searching of the tree terminates and the conflict key list is searched to locate the correct corresponding record. Since the list is searched sequentially, the generation of duplicate keys is undesired. Thus, it is desirable to select a hash function that minimizes duplicate keys.

Following the creation of the binary search tree, an identified certain record is located as follows. A hashed key is generated based on the data in fields Key 1 and Key 2 of the certain record utilizing the same hash key function utilized to generate the binary search tree. This results in the generation of a hashed key with a value that will equal the previously generated hashed key for the same record when the search tree was created. The hashed key for the record to be located is compared by searching through the binary search tree just as if this key were to be inserted into the tree. That is, the key of the record to be located is compared against tree nodes beginning at the vertex node with left and fight branching corresponding to less than and greater than inequalities.

For example, if record ID 6 is desired to be located in the database based on known values of Key 1 and Key 2 for record ID 6, a key having a value of 9490 will be generated based on the Key 1 equal to 20 and Key 2 equal to 113. Beginning at the vertex node 30 the fight branch is followed since the search key is greater than the key of node 30 and another fight branch is followed at consolidated node 32, 36 since it is again greater. Arriving at node 40, the comparison of the search key and node's key results in an equality. In order to verify that the correct node has been located, a comparison of the data in the Key 1 and Key 2 fields of the record to be located and the associated tree record at address ADR 6 is made. The correct record has been located since the data comparison results in an equality. If the data in Key 1 and Key 2 for ID 6 did not equal the corresponding data used to generate the search key, a conclusion would be reached that an erroneous or duplicate key situation exists and the separate conflict key list would be sequentially searched in order to locate a matching key. Failure to locate the desired record in the conflict key list results in a no matching record condition which could result if the record has not been entered in the tree or if a data entry error occurred either in entering the tree data or in entering the search record data.

It will be apparent to those skilled in the art that the utilization of the method in accordance with the present invention is effective where more than a small number of records exists in a database. Where only a small number of records exists, a straightforward sequential search of the records will yield results which are more efficient than the embodiment of the present invention because a certain minimal number of steps are required in the generation of the search key and in making the comparisons as the tree is traversed. The method in accordance with the present invention becomes more advantageous as the number of records in the database increases. An evaluation of the efficiency of the present invention may be visualized by considering that as each tree branch is traversed, a substantial number of keys associated with non-traversed branches are eliminated from the search. Thus, regardless of the search key value, a substantial population of the tree will never be searched. This leads to a quicker convergence to the desired record as compared with a sequential search of a large table of unsorted records.

Although the embodiment of the present invention has been described as providing an advantageous result with regard to a telecommunications switching system, it will be apparent to those skilled in the art that other database applications will benefit from an embodiment of the invention. A library with a database of holdings is another application where the record to be located is known, e.g. the record associated with a book to be checked out by a library member has to be updated. An inventory control database represents another application that could benefit, e.g. return of an item to stock results in the need to update the record(s) associated with the item as does the removal of the item from stock.

Although an embodiment of the invention has been illustrated and shown herein, the scope of the invention is defined by the claims which follow.

We claim:

1. In a telecommunications switching system having a database that stores records containing operating parameters, a method for locating a certain record in the database comprising the steps of:
    generating a key for each record using a hash function based on data in a predetermined set of fields in each record;
    creating and storing a search tree having a plurality of linked tree nodes, each tree node comprising one of said keys and an address of a corresponding record, said keys arranged on the tree relative to the numerical value of keys previously entered in the tree;
    generating a certain key corresponding to said certain record to be located in the database using said hash function based on known data in said predetermined set of fields;
    determining if a new key to be added to the tree equals an existing key on the tree, determining if the record associated with the new key is a modified version of the record associated with said existing key, and if former and the later determinations are true, replacing the address stored with the existing key with the address associated with the new key, if said former determination is true and said later determination is not true, storing said new key and the record associated with the new key in a duplicate key list;
    searching the nodes of said tree to find a matching key with a value equal to the value of the certain key;
    if said searching fails to find a key with a value equal to the value of the certain key, sequentially searching said duplicate key list to find a matching key;
    utilizing the address stored with the matching key to locate the certain record in the database.

2. The method according to claim 1 wherein said searching step comprises the steps of searching a binary search tree beginning at a vertex node of the tree and selecting one tree branch to follow from a plurality of tree branches based on the value of said certain key relative to the value of the key contained in the node to which the plurality of branches are coupled.

3. The method according to claim 1 wherein each of said keys comprise a digital word having the same number of bits.

4. The method according to claim 1 wherein said parameters comprise data that can be modified by users of the system.

5. The method according to claim 1 further comprising the step of reading said located record to obtain said operating parameters stored therein.

6. A method for locating the records in a database comprising the steps of:
    generating a key for each record using a hash function based on data in a predetermined set of fields in each record;
    creating and storing a search tree having a plurality of linked tree nodes, each tree node comprising one of said keys and an address of a corresponding record, said keys arranged on the tree relative to the numerical value of keys previously entered in the tree;
    generating a certain key corresponding to a certain record to be located in the database using said hash function based on known data in said predetermined set of fields;
    determining if a new key to be added to the tree equals an existing key on the tree, determining if the record associated with the new key is a modified version of the record associated with said existing key, and if former and the later determinations are true, replacing the address stored with the existing key with the address associated with the new key, if said former determination is true and said later determination is not true, storing said new key and the record associated with the new key in a duplicate key list;
    searching the nodes of said tree to find a matching key with a value equal to the value of the certain key;
    if said searching fails to find a key with a value equal to the value of the certain key, sequentially searching said duplicate key list to find a matching key;
    utilizing the address stored with the matching key to locate the certain record in the database.

7. The method according to claim 6 wherein said searching step comprises the steps of searching a binary search tree beginning at a vertex node of the tree and selecting one tree branch to follow from a plurality of tree branches based on the value of said certain key relative to the value of the key contained in the node to which the plurality of branches are coupled.

8. The method according to claim 6 wherein each of said keys comprise a digital word having the same number of bits.

9. An apparatus for locating a certain record in a database containing a plurality of records comprising:
    means for generating a key for each record using a hashing function based on data in a predetermined set of fields in each record;
    means for creating and storing a binary search tree having a plurality of linked tree nodes, each tree node comprising one of said keys and an address of a corresponding record, said keys arranged on the tree relative to the numerical value of keys previously entered in the tree;

means for generating a certain key corresponding to a certain record to be located in the database using said hashing function based on known data in said predetermined set of fields;

means for determining if a new key to be added to the tree equals an existing key on the tree and if the record associated with the new key is a modified version of the record associated with said existing key, means responsive to the former and the later determinations being true for replacing the address stored with the existing key with the address associated with the new key, means responsive to said former determination being true and said later determination being not true for storing said new key and the record associated with the new key in a duplicate key list;

means for searching the nodes of said tree to find a matching key with a value equal to the value of the certain key;

means responsive to said searching means failing to find a key in said nodes with a value equal to the value of the certain key for sequentially searching said duplicate key list to find a matching key;

means for utilizing the address stored with the matching key to locate the certain record associated with said certain key.

10. The apparatus according to claim 9 wherein said searching means searches a binary search tree beginning at a vertex node of the tree and selects one tree branch to follow based on the value of said certain key relative to the value of the key contained in the tree node to which the plurality of branches are coupled.

11. The apparatus according to claim 9 wherein each of said keys comprise a digital word having the same number of bits.

* * * * *